US008190705B2

(12) United States Patent
Bennett et al.

(10) Patent No.: US 8,190,705 B2
(45) Date of Patent: *May 29, 2012

(54) COMMUNICATION CAPABILITY COUPONS

(75) Inventors: William E. Bennett, Tucson, AZ (US);
James E. Christensen, Cortlandt Manor, NY (US); Peter K. Malkin, Ardsley, NY (US); John T. Richards, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 365 days.

This patent is subject to a terminal disclaimer.

(21) Appl. No.: 12/204,442

(22) Filed: Sep. 4, 2008

(65) Prior Publication Data

US 2008/0320101 A1    Dec. 25, 2008

Related U.S. Application Data

(63) Continuation of application No. 10/624,107, filed on Jul. 21, 2003, now Pat. No. 7,424,537.

(51) Int. Cl.
*G06F 15/16* (2006.01)
(52) U.S. Cl. ...... 709/217; 709/227; 709/228; 379/90.01
(58) Field of Classification Search .................. 709/217, 709/204, 246, 230, 218, 219, 223–229; 715/700, 715/727–729, 746, 736, 737, 866, 740; 719/310, 719/311–321, 328–332; 348/14.03; 379/31, 379/32.01, 36–51, 90.01, 142.01, 142.07, 379/100.06, 93.01, 93.35, 93.23, 88.13, 88.17, 379/88.19, 88.2, 88.21, 142.15, 215.01, 211.01, 379/201.01, 230, 200; 455/417; 705/50–80
See application file for complete search history.

(56) References Cited

U.S. PATENT DOCUMENTS

| 5,884,272 | A |   | 3/1999 | Walker et al. |
| 5,987,108 | A | * | 11/1999 | Jagadish et al. ......... 379/114.01 |
| 6,035,031 | A | * | 3/2000 | Silverman ................ 379/209.01 |
| 6,169,795 | B1 | * | 1/2001 | Dunn et al. .............. 379/209.01 |
| 6,449,354 | B1 |   | 9/2002 | Scott et al. |
| 6,714,544 | B1 |   | 3/2004 | Bosloy et al. |
| 6,724,872 | B1 | * | 4/2004 | Moore et al. ............... 379/93.35 |
| 6,895,558 | B1 | * | 5/2005 | Loveland ..................... 715/746 |
| 6,944,278 | B1 | * | 9/2005 | Nielsen ..................... 379/210.01 |
| 7,003,305 | B2 | * | 2/2006 | Urs .............................. 455/466 |
| 7,117,445 | B2 | * | 10/2006 | Berger .......................... 715/752 |
| 7,124,123 | B1 | * | 10/2006 | Roskind et al. ................. 706/60 |

(Continued)

*Primary Examiner* — Wing Chan
*Assistant Examiner* — Ruolei Zong
(74) *Attorney, Agent, or Firm* — Scully, Scott, Murphy & Presser, P.C.; Daniel P. Morris, Esq.

(57) ABSTRACT

A system and method establishes communications between first and second parties. A request initiated by a first party is generated for establishing a communications channel over a first communications network between the first and second parties. An intermediary server device interrupts the request and attempts to generate the channel. If unsuccessful, the server device translates the request into a data network object, which is passed to the second party via a second communications network. The network object enables the second party to communicate acceptance for establishing communication with the first party over the first communications network. The second party invokes the network object upon receipt thereof or at a future time for creating a communications channel between the first and second parties. Alternately, the first party may establish a coupon for communication directly to a second party without a first prior attempt to create the channel.

34 Claims, 13 Drawing Sheets

U.S. PATENT DOCUMENTS

| | | |
|---|---|---|
| 7,203,294 B2 * | 4/2007 | Carnazza et al. ........ 379/142.07 |
| 2002/0071539 A1 | 6/2002 | Diament et al. |
| 2002/0164006 A1 | 11/2002 | Weiss |
| 2002/0188684 A1 | 12/2002 | Liang |
| 2003/0128697 A1 | 7/2003 | Narain et al. |
| 2004/0078468 A1 | 4/2004 | Hedin et al. |
| 2004/0111478 A1 * | 6/2004 | Gross et al. .................... 709/206 |
| 2004/0127233 A1 * | 7/2004 | Harris et al. .................. 455/458 |

* cited by examiner

COMMUNICATION CAPABILITY COUPONS

RELATED APPLICATIONS

This application is a continuation application of U.S. application Ser. No. 10/624,107, filed Jul. 21, 2003.

BACKGROUND OF THE INVENTION

1. Field of the Invention

The present invention relates to the establishment of a communications channel over a communications network, and particularly, a system that enables a first user to provide a second user with a persistent network object (e.g., a token or coupon) with which the second user can establish a communications channel over a first network between the first and second user, the second user invoking this establishment via a second network.

2. Description of the Prior Art

Supposing a first user wants to communicate with a second user via a particular network (e.g., a telephone call) (or range of channels), currently the first user may utilize Instant Messaging (IM) and standard telephone service (POTS, plain old telephone service), both of which allow the first user to request a communications channel (e.g., a telephone conversation) with the second user, a request that the second user can either accept or decline. In both cases, however, the request and communications channel must use the same network and protocol. Further, the request is synchronous, meaning that the first user must wait for the second to decide; if the first user deletes the client on their side of the request (e.g., by shutting off their IM client, or hanging up their phone), the request is deleted.

Call history, a feature provided by telephone service providers such Verizon, provides a history to enable a second user (i.e., the recipient) to attempt to create a telephone communications channel back to the first user after the first user has already hung up. Here, all communications must be delivered over a single communications channel, i.e., POTS. In addition, the first user cannot provide any additional information to the second user concerning their initial request (e.g., the reason or urgency of the request).

Phone Mail is a feature that allows the first user to request a given communications channel with the second user and leave a message—including information about the communications request—that the second user can review after the first user has disconnected their client (e.g., hung up). Here, the second user must use the same communications channel request method as the first user in order for them to establish the communications channel by the first user (commonly referred to as "phone tag").

Online-Call-Waiting, a service provided by RingCentral, Inc's Buz Me!™ product, supports a situation where a second user receives a (POTS) telephone call from the first user while they are using their telephone line for network access. When this occurs, a pop-up dialog appears on the second user's computer screen allowing them to accept or refuse the telephone call request. Here, all data coming to the second user must flow through their telephone connection; separate data and telephone network connections are not possible.

ConnectIcon, developed by Bell Labs, allows a first user to provide the second user with a data network object, which can both supply the second user with a message and provide the second user with icons that will establish various types of communications channels to the first user (including, but not limited to telephone). This network object can also provide status information concerning the first user's communications channels, e.g., most recent use. This technique does not allow the first user to specify the particular type of connection it wants to establish with the second user.

Voice service on Blackberry devices allow the first user to request a phone call to the second user from a program running on the Blackberry device (e.g., a new address book application), the phone call received by the second user via POTS. This service is not functionally different from the standard phone server, since all data flows over the telephone network and the request is synchronous.

The Camp On feature provided by the ROLM telephone service handles the case where the first user calls the second user, and the second user's phone is busy. The feature, when activated, monitors the second user's line, and when free, calls the first user and then the second user. This feature only uses one communications network: neither the first nor second user can get any indication of the call status via a data network application.

A first user can provide the second user with a Calling Card, which provides payment for all telephone calls made by the second user, as long as the second user places the call in a specially prescribed manner (e.g., one in which the second user indicates the account number stamped onto the card). One with regular skill in the art will appreciate that since the second user can employ the Calling Card to obtain a data network connection (e.g., via an analog telephone line that their computer uses via a modem), the Calling Card can provide payment for both telephone and data network communications. The Calling Card does not restrict whom the second user calls, nor does it restrict the communication channels (i.e., the first user cannot specify how they are to be contacted).

A Call forwarding feature, such as described in commonly-owned, co-pending U.S. patent application Ser. No. 09/168,248, filed Oct. 84, 1998, entitled "Sender-Specified Delivery Customization" and Ser. No. 09/511,977, filed Feb. 24, 2000 entitled "Method and Apparatus for Providing a Scalable Pervasive Notification Service" all provide methods for finding and establishing a communication link between a first user and a second user, but none provides a method enabling the first user to initiate a request over a second network with the request delivered—via a persistent data network object— to the second user via a first network.

While each communications system feature mentioned herein is adequate for its intended purposes, there remains a need in the art to enable a first user to provide a second user with the capability to establish a first type of communications channel with them, this capability relayed to and exercised by the second user via a second communications channel, with the capability persisting after the first user has disconnected from the first channel, and with the capability being sensitive to the first user's availability (e.g., disabling the capability when the first user is unavailable).

It would thus be highly desirable to provide a system and method that enables a first user to provide a second user with the capability to establish a first type of communications channel with them, this capability relayed to and exercised by the second user via a second communications channel, with the capability persisting after the first user has disconnected from the first channel, and with the capability being sensitive to the first user's availability (e.g., disabled when the first user is unavailable).

SUMMARY OF THE INVENTION

According to the present invention, there is provided a system and method for establishing communications channel between a first and second party. In one embodiment, a request initiated by a first party is generated for establishing a communications channel over a first communications network between the first and second party. An intermediary server device interrupts receipt of the request and attempts to generate the channel. If unsuccessful in the attempt, the server device translates the request into a data network object, which is passed to the second party via a second communications network. The network object enables the second party to communicate acceptance for establishing communication with the first party over the first communications network. The second party invokes the network object upon receipt thereof or at a future time for initiating creation of a communications channel between the first and second parties. Alternately, the first party may establish the network object in the form of a coupon for communication directly to the second party without a first prior attempt to create the channel.

Advantageously, the second user can invoke the network object upon receipt thereof or at a future time regardless of the connectivity status of the first user.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

This invention defines a system and method that enables a first user to request a telephone call with a second user; a request the second user receives via a data network object, referred to herein as a "communications capability coupon". According to a first embodiment, the second user can then accept this request via the communications capability coupon and then initiate establishment of the telephone call with the first user.

Figure 1:
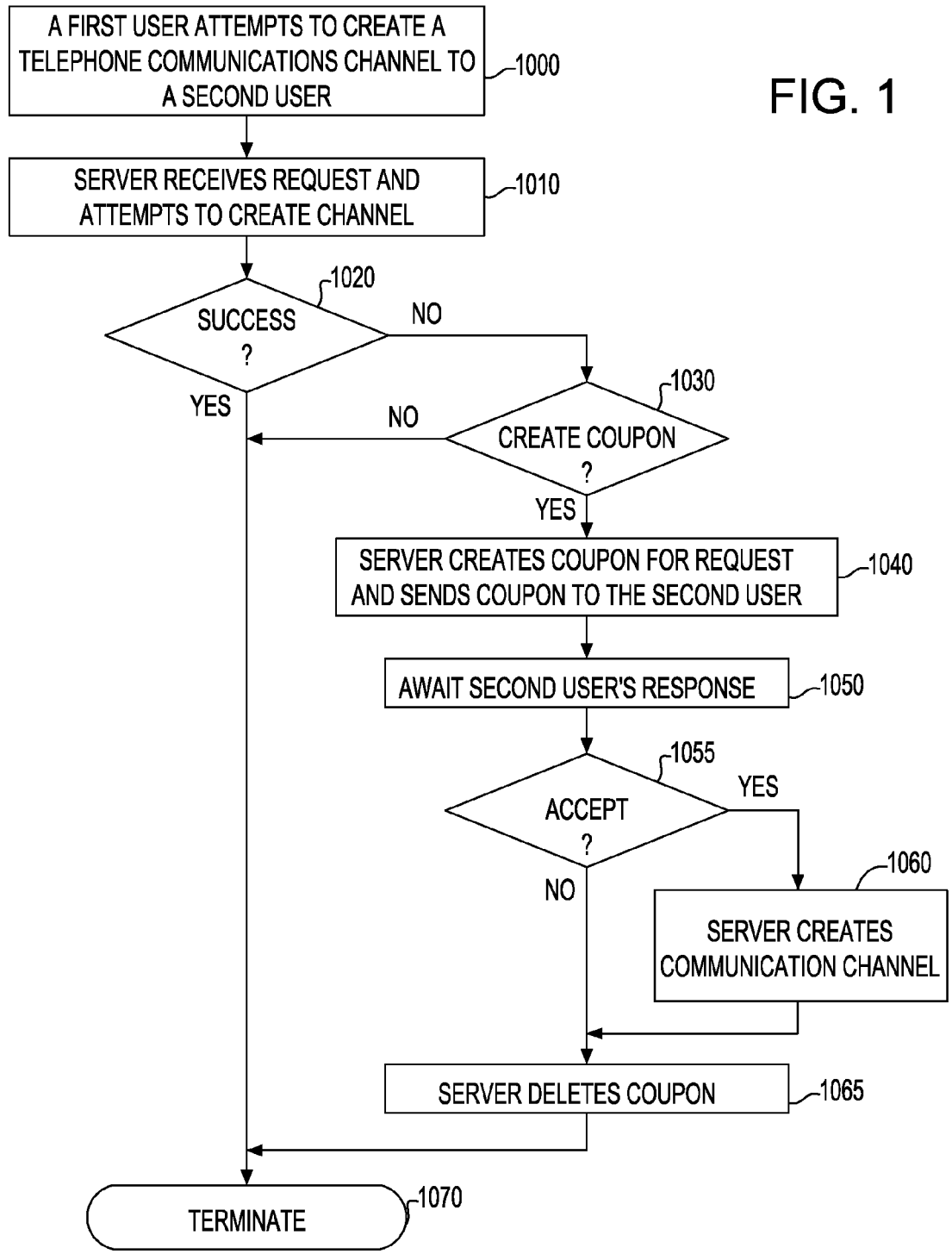
FIG. 1 shows an overview of the current invention's process according to a first embodiment of the current invention.

FIG. 1 illustrates an overview of the process according to the first embodiment of the invention. In step 1000, the first user requests a phone conversation with a second user. As will be described in detail with reference to FIGS. 2 through 9, this request can be made from either a data network node (e.g., a network connected computer) or from a telephone network node (e.g., a standard telephone). In step 1010, an intermediary coupon server (described in detail with reference to FIGS. 2 through 7) receives the first user's request and attempts to establish the telephone call. In step 1020, the success of this attempt is checked, and if successful, the process terminates in step 1070. If not, then the coupon server asks the first user whether they would like to send the second user a communications capability coupon in step 1030. If not, the process terminates in step 1070. If they do, then, in step 1040, the coupon server creates a coupon and sends it to the second user. As will be described in detail with reference to FIGS. 4 through 7, this coupon may be modified between the time it is created and the second user responds to it. These modifications include, but are not limited to: 1) the coupon server temporarily deactivating the coupon for periods when the first user is unavailable; and 2) the coupon server deleting the coupon in response to a request from the first user. In step 1050, the coupon server waits for the second user to respond to the coupon and, in step 1055 the coupon server checks this response. If the second user denies the request, then, in step 1065, the coupon server deletes the coupon, following which the process terminates in step 1070. If the second user accepts the coupon's request, then the coupon server establishes a telephone call between the first and second user at step 1060. Following this, control continues at step 1065 where the coupon server deletes the coupon, after which the process ends in step 1070.

Those of ordinary skill in the art will appreciate that this process could be modified by eliminating step 1065 where the coupon server deletes the coupon, instead continuing control at step at step 1050, where the coupon server awaits the second user's response. This extension would enable a given coupon to be used more than once by a given second user. For example a parent could send a child at college a coupon enabling the child to call them. With the modified process, the child would be able to invoke (i.e., accept) the coupon on several different occasions. Thus, the modified process enables the first user to give the second user the repeatable capability of calling them.

Additionally, as will be described in detail with reference to FIG. 17, a communications capability coupon can also be used to enable a first user to pay for a particular type of communication between them and a second user, where the second user establishes each instance of the communication. For example a parent could give a their child a communications capability coupon that pays for every call the given child makes to the parent. Note that the coupon could only be used to make telephone calls and these calls would have to be to the parent.

Figure 2:
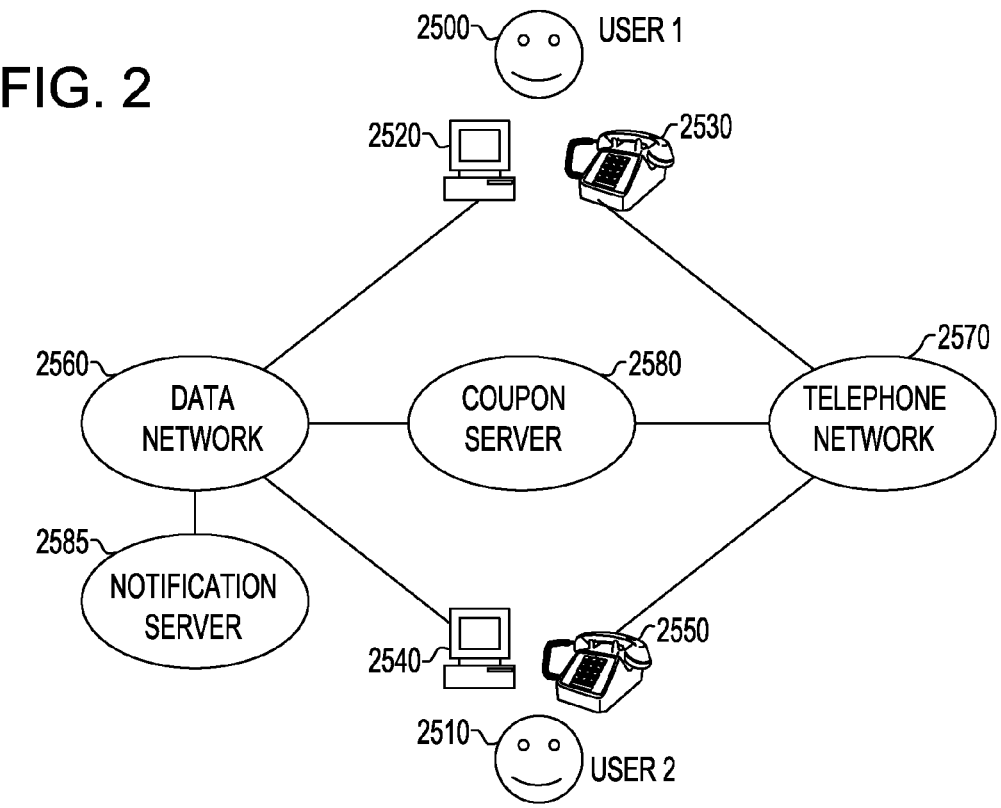
FIG. 2 is a diagram of a network according to a first embodiment of the current invention.

FIG. 2 depicts an example of the network topology of the first preferred embodiment. As shown, there is a first 2500 and second 2510 user, labeled "user 1" and "user 2" respectively, user 1 2500 having both a data network node 2520 and a telephone network node 2530; and user 2 2510 having both a data network node 2540 and a telephone network node 2550.

Both of the data network nodes 2520 and 2540 are connected to a data network 2560, and both of telephone network nodes 2530 and 2550 are connected to a telephone network 2570. There is also a coupon server 2580 connected to both the data 2560 and telephone 2570 networks, and a notification server 2585 connected to the data network 2560.

Examples of the data network 2560 include, but are not limited to: the Internet and private intranets.

Examples of the telephone network 2570 include, but are not limited to: the standard telephone networks, access to which is provided by Verizon, AT&T, and the like.

The data network nodes 2520 and 2540 (both described in detail with reference to FIGS. 8 and 9) may include, but are not limited to: an IBM ThinkPad running Windows 95, and a web browser such as Microsoft's Internet Explore, or Apple's Power Macintosh running MacOS 8.5.6 and a web browser such as Netscape's Navigator. The data network nodes 2520 and 2540 can also include network-connectable mobile (e.g., portable) devices such as that sold under the trademark Work-Pad by IBM, as well as smart cellular telephones (e.g., devices which can act as a cellular telephone as well as run network applications, like web browsers), such as those sold under the trademark Nokia 9000i by Nokia, Inc.

The telephone network nodes 2530 and 2550 can include any device able to support communications through the telephone network 2570, including standard telephones like those sold by Verizon and mobile phones, like that sold under the trademark Nokia 9000i by Nokia.

Although each of users 2500 and 2510 is shown having only a single data network node and telephone network node, the current invention is able to support users employing more than one of each. Also, although only two users are shown, the current invention is able to support more than only two.

Those with regular skill in the art will appreciate that there exist devices, such as smart cellular telephones, like that sold under the trademark Nokia 9000i by Nokia, that can act both as a data network node and a telephone network node. Thus either or both of the device pairs, 2520 and 2530, or 2540 and 2550, could be implemented using a single device.

The coupon server 2580 (described in detail with reference to FIGS. 3-7) can be any computing node including, but are not limited to the products sold by the assignee International Business Machines Corporation (IBM Corporation) under the trademark PowerPC™, running the operating system and server application suite sold by Microsoft under the trademark Windows NT™. In addition, to support telecommunications applications, the coupon server 2580 is equipped with telephone communications hardware and software including, but not limited to: devices supplied by the Intel Corporation in their telecom product class (refer to http://www.intel.com/design/network/products/telecom/index.htm for details). Those with ordinary skill in the art will appreciate that although the data network nodes 2520 and 2540 communicate with the coupon server 2580 using the HTTP protocol, the current invention can also be implemented using other protocols including but not limited to general sockets (for details, see the reference authored by Douglas corner entitled "Internetworking with TCP/IP, Vol. 1 Principles, Protocols and Architecture." Prentice Hall, Englewood Cliffs, N.J., 1991.

Figure 3:
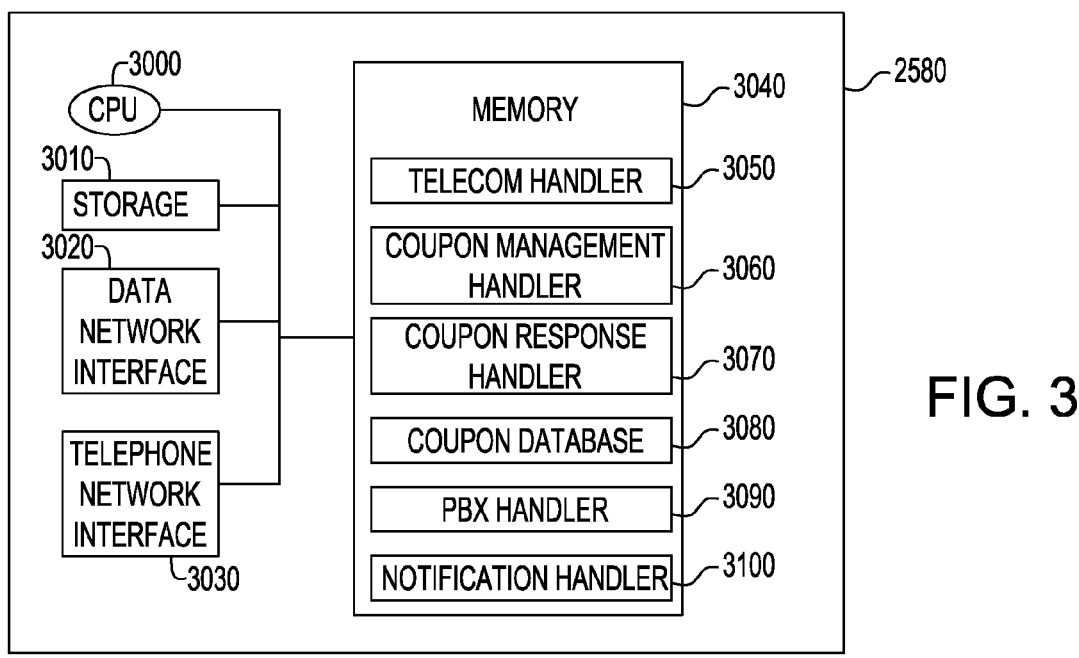
FIG. 3 is a component diagram of the coupon server according to a first embodiment of the current invention.
Figure 8:
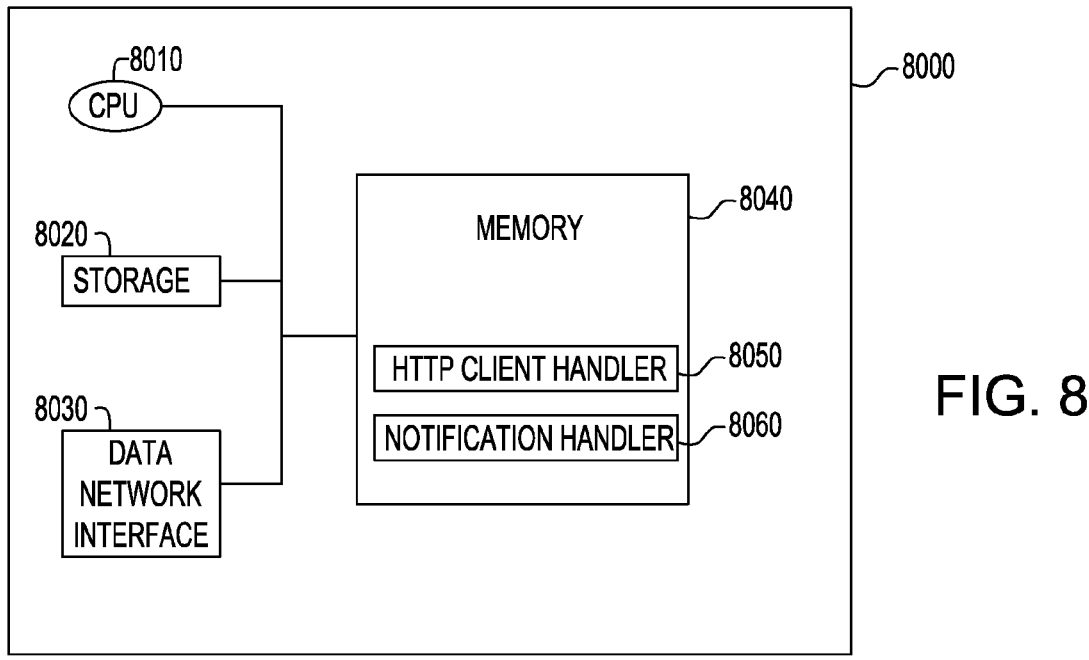
FIG. 8 is a component diagram of the data network node according to a first embodiment of the current invention.

The notification server 2585 is any computing node that can act as the communication server for a client device such as notification handlers 3100, 8060 described in greater detail herein with reference to FIGS. 3 and 8, respectively. This includes, but is not limited to the products sold by IBM Corporation under the trademark PowerPC™, running the operating system and server application suite sold by Microsoft under the trademark Windows NT, this node also running the messaging server application including, but not limited to such products as that sold by Lotus under the trademark Sametime. Those with regular skill in the art will appreciate that this messaging server application software could also be run on the coupon server 2580. One with skill in the art will also appreciate that there exist messaging systems that do not require any central server, such as that provided by the Groove product The data that is provided by a given communication capability coupon includes the identification (ID) of the first user and the telephone number of their telephone network node 2530, as well as the telephone number of the second user's telephone network node 2550 and the IP address or host name of their data network node 2540. A communication capability coupon may also indicate a message from the first user to the second user, e.g., the reason for the call. It may additionally include an indication of the number of times the second user is allowed to invoke the given coupon, a counter that would be decremented each time the coupon was successfully used (i.e., causing a telephone call between the users). The coupon may additionally indicate the amount of charge the first party is willing to cover, e.g., a parent could give a child a coupon with which they can call the parent, but the parents can specify the total amount they are willing to cover. In addition, a coupon may include an indication that connection attempts from User 2 2510 can break into any existing communication channel User 1 may already have in place. For example, this would enable a husband to give his pregnant wife a communications capability coupon with break-in capability, so that she could establish a phone call to him even if he happens to be talking to someone else on his phone when she requests the call.

A given coupon could have more than a single telephone number for the first or second user. If, say, a given coupon has three different telephone numbers for the first user, then when the second user invoked the coupon, the coupon server will try each of the numbers until a free one is found. Similarly, if a given coupon has three different telephone numbers for the second user, then the second user may specify which of the numbers they want used when they invoke the coupon.

FIG. 3 is a block diagram depicting a detailed example of the coupon server 2580 architecture for managing the communication capability coupons and handling the establishment of the telephone network based communications. The server 2580 preferably includes a CPU 3000, a storage device 3010, such as a disk or DASD; a data network interface 3020, a telephone network interface 3030, and memory 3040 such as RAM. According to the present invention, the coupon server logic (as will be discussed in more detail with reference to FIG. 4), is preferably embodied as computer executable code that is loaded from remote (e.g., over the data network 2560 via the data network interface 3020) or local permanent optical (CD-ROM) or magnetic storage such as disk, or DASD 3010 into memory 3040 for execution by CPU 3000. Data network 2560 communications to and from the server 2580 are made through the data network interface 3020, communication types including but not limited to Ethernet, token-ring, and wireless such as RF- and IR-based. Telephone network 2570 communications, including those between devices 2530 and 2550 are managed through the telephone network interface 3030. In the preferred embodiment, the coupon server 2580 is the PBX that manages all calls to and from the first user's telephone network node 2530. As already mentioned, this capability can be provided by hardware and software including, but not limited to: that sold by the Intel Corporation (refer to http://www.intel.com/design/network/ products/telecom/index.htm for details). The memory 3040 preferably includes a telcom handler 3050, as will be discussed in greater detail herein with reference to FIGS. 4 and 5, a coupon management handler 3060, as will be discussed in greater detail herein with reference to FIGS. 4 and 6, a coupon response handler 3070 (discussed in more detail with reference to FIGS. 4 and 7), a coupon database 3080, a PBX handler 3090, and a notification handler 3100. An example of a product that would support of the coupon database 3080 includes but is not limited to the database server product sold by IBM Corporation under the trademark DB/2. Those with ordinary skill in the art will appreciate that the coupon database 3080 could be run on another remote network connected node and then accessed via the data network 2560. An example of a product that supports the PBX handler 3090 includes the product sold by the Intel Corporation under the product name DSE DL-3002, including its supporting software. An example of a product that supports the notification handler 3100 includes, but is not limited to the product sold by Lotus under the trademark Sametime.

Figure 4:
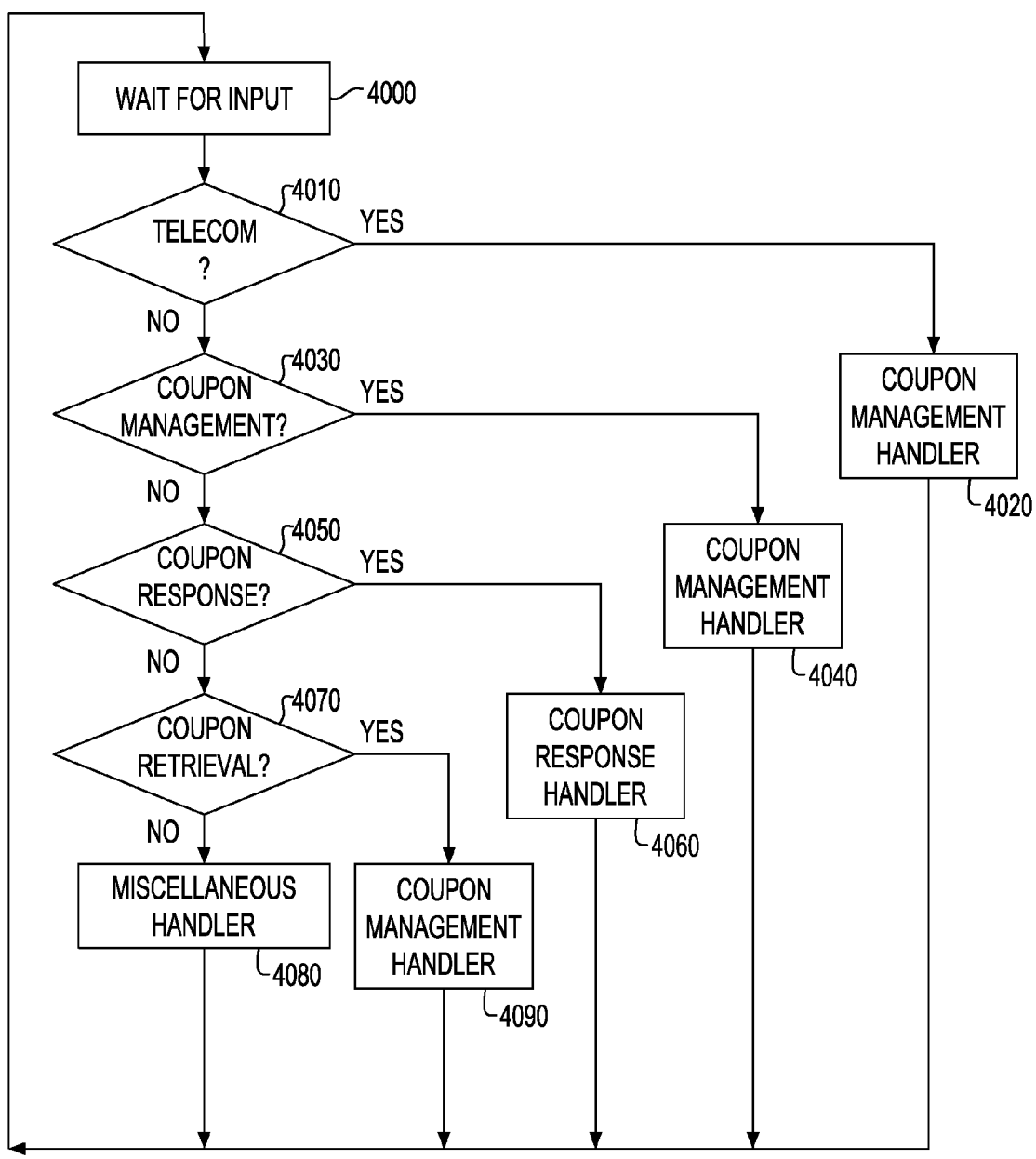
FIG. 4 is a flow chart of the coupon server's logic according to a first embodiment of the current invention.

FIG. 4 illustrates the logic flow implemented by the coupon server 2580. As shown, in step 4000, the server 2580 waits for input. Given input, its type is checked in step 4010, and if it is telephone related (e.g., an attempt from the first user 2500 to call the second user 2510), then the telcom handler 3050 is invoked in step 4020, following which control continues at step 4000. If the input is not telephone related, then a determination is made in step 4030 as to whether it involves coupon management (e.g., a request from the first user's data network node 2520 to create or delete a coupon). If so, then the coupon management handler 3060 is invoked in step 4040, following which control continues at step 4000. If the check in step 4030 fails, then a determination is made in step 4050 to check if the input concerns a response to a coupon (e.g., the second user accepting the coupon's request), and if so, then the coupon response handler 3070 is invoked in step 4060, following which control continues at step 4000. If the input is not response related, then a determination is made in step 4070 as to whether the input is a request for a coupon (e.g., a request by the second user 2510 for all coupons related to themselves, a request likely to occur when the second user 2510 starts up their data network node 2540). If the input is a request for a coupon, then the coupon management handler 3060 is invoked in step 4090, following which control continues at step 4000. If the input is not a coupon retrieval request then a miscellaneous handler, beyond the scope of the current invention, is invoked in step 4080, following which control continues at step 4000.

Figure 5:
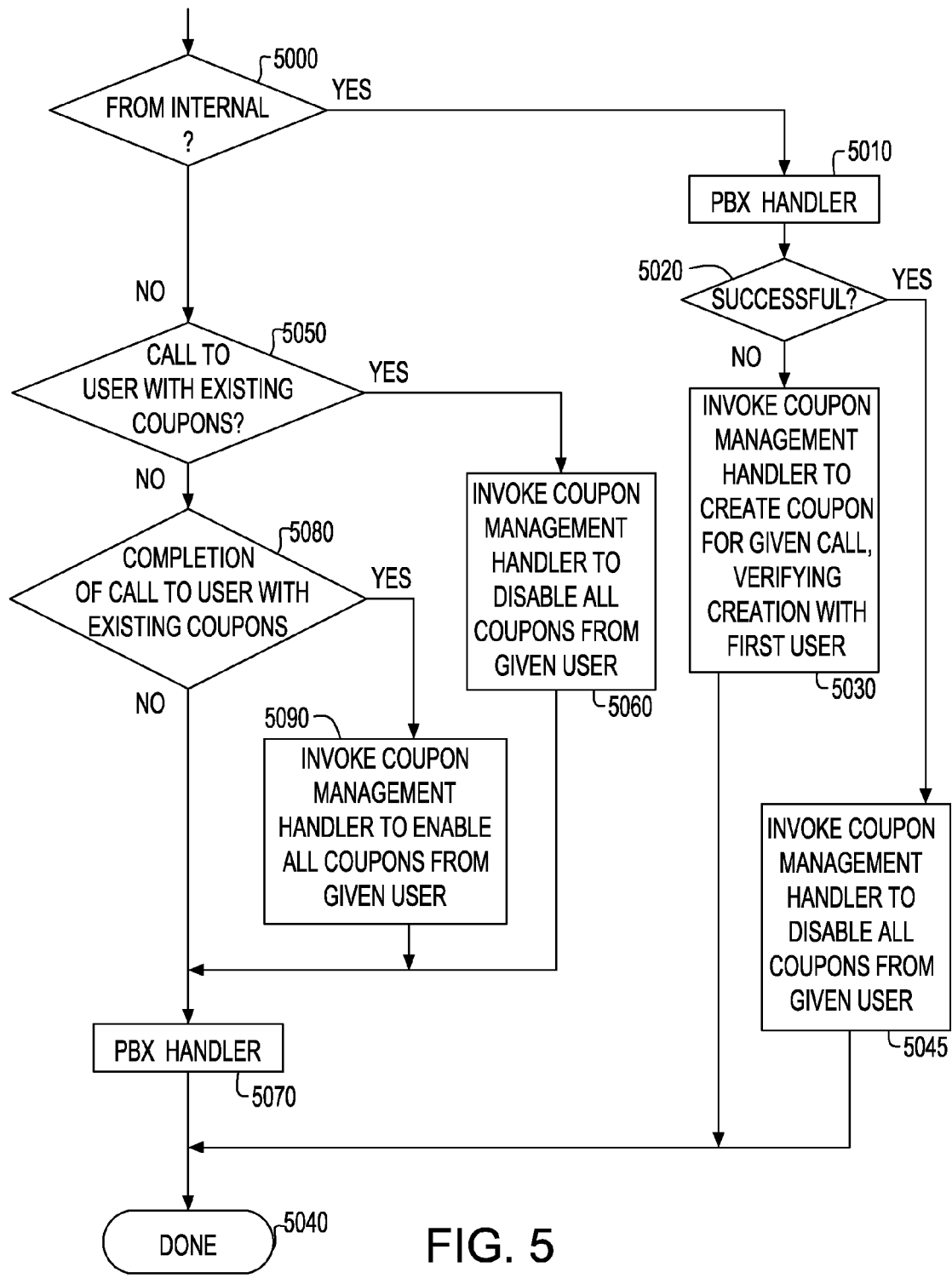
FIG. 5 is an example of the telcom handler according to a first embodiment of the current invention.

FIG. 5 illustrates the logic flow implemented by the telcom handler 3050 according to a first embodiment of the current invention, which allows the coupon server 2580 to monitor the telephone network 2570 for purposes of creating and updating communications capability coupons. As shown, in step 5000, the telcom handler 3050 checks whether the given telephone event is a call from a telephone within the PBX's domain of control. If the event is a call from a telephone within the PBX's domain of control, then in step 5010, the PBX Handler 3090 is called to try and establish the requested communications channel. The success of this attempt is checked in step 5020, and if the channel was created, then in step 5045, the coupon management handler 3060 is invoked, passed the number of the internal telephone network node and instructed to disable all coupons associated with this number. This is done to avoid unnecessary connection attempts to the now busy telephone. Following this, the telcom handler 3050 terminates at step 5040. If the connection attempt fails, then, in step 5030, the coupon management handler 3060 is invoked to ask the sender if they want to create a communications capability coupon, the telephone number of both the initiator and target passed in this invocation, and the corresponding coupon is created if they accept. Following this, the handler process terminates at step 5040. If the event is not a call is from an internal telephone node, then, in step 5050, the telcom handler 3050 determines whether the telephone event is a call to an internal telephone node for which there is an associated coupon, i.e., the telephone number of a user who has granted a coupon to some other user. If so, then in step 5060, the coupon management handler 3060 is invoked, passed the number of the internal telephone network node and instructed to disable all coupons associated with this number. Again, this is performed in order to avoid unnecessary connection attempts to the now busy telephone. Following step 5060, the PBX handler 3090 is invoked to complete the call, after which the telcom handler 3050 terminates at step 5040. Those with ordinary skill in the art will appreciate, that even if a given telephone is being used, an additional call may break into the channel given the necessary authority and access, e.g., as is performed by the "call waiting" telephone feature offered by telecom companies, or by police in the case of an emergency. Since the coupon server is in charge of all telephone communications channels, the current invention permits a second user to break into an existing telephone communications channel when they exercise their coupon. This intrusion-level interrupt feature may be another data field specified in a given coupon. Additionally, as will be described in detail with reference to FIG. 17, a given service provider may charge more for coupons having and using this feature.

Returning to FIG. 5, if the check in step 5050 fails, a determination is made at step 5080 to check whether the telephone event is the completion of a call to a telephone number associated with an existing coupon. If so, then in step 5090, the coupon management handler 3060 is invoked, passed the telephone number and told to enable all associated coupons. Following step 5090, the PBX handler 3090 is called to fulfill the call completion (if necessary), after which the handler 3050 terminates at step 5040. If the check at step 5080 fails, then the PBX handler 3090 is invoked in step 5070, following which the handler 3050 terminates at step 5040.

Figure 6:
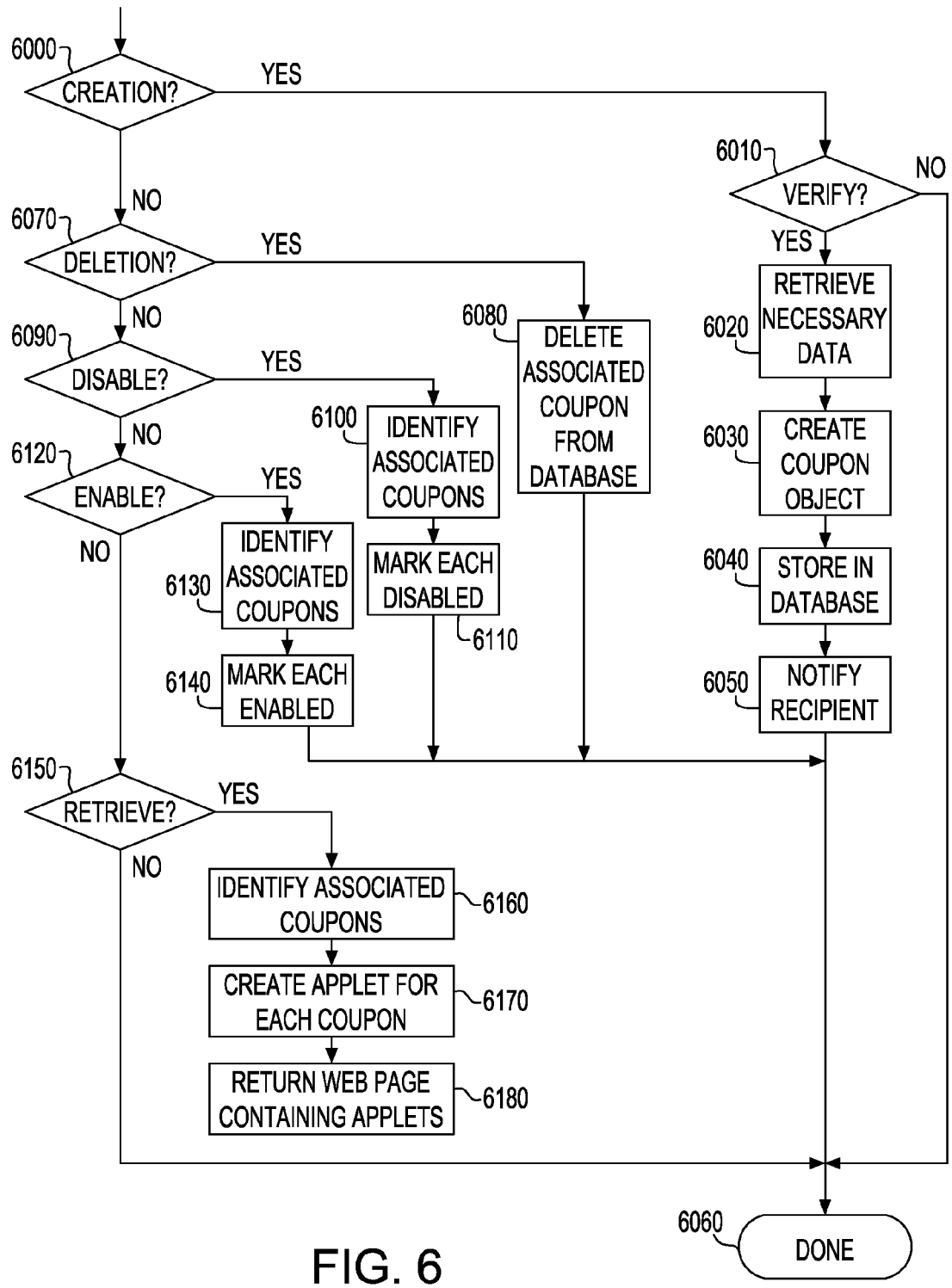
FIG. 6 is an example of the coupon management handler according to a first embodiment of the current invention.

FIG. 6 illustrates the logic flow implemented by the coupon management handler 3060, according to a first embodiment of the current invention, which handles the creation, deletion, state modification and retrieval of communications capability coupons. As shown, step 6000 checks whether the current handler request is for the creation of a coupon. If so, then in step 6010, if specified in the handler 3060 request, the call initiator, e.g., user 1 2500, is prompted to verify that they want to create a coupon. If not, then the handler terminates in step 6060. If they do, then in step 6020, the handler 3060 retrieves all data required for the creation of a coupon. Such data includes but is not limited to the telephone number of call initiator and target, as well as a user ID for the target user, e.g., user 2 2510. In the preferred embodiment, this user ID is the target user's Sametime ID, but the current invention also supports other forms, including, but not limited to: a user ID/password pair. The importance of this user ID is that the coupon server 2580 uses it to direct notifications to the target user via the notification handler 3100, and for coupon requests to determine the associated coupons (e.g., a request for coupons arrives specifying a particular user ID, and all coupons whose recipient has that user ID are returned). In step 6030, a coupon object is created for the given information, this object including, but not limited to: an instance of a Java class, or like object construct. In step 6040, the coupon object is stored in the coupon database 3080, and in step 6050, the target user, e.g., user 2 2510, is sent a notification of the existence of the coupon. In the preferred embodiment, this notification is sent using a Sametime message using the notification handler 3100, this message including a URL that, when retrieved will provide an applet the retriever can use to exercise the coupon. Following step 6050, the handler 3060 terminates at step 6060. Otherwise, if the check in step 6070 determines that the handler 3060 request is for a coupon deletion, then in step 6080, the associated coupon is identified and deleted from the coupon database 3080, following which the handler 3060 terminates at step 6060. If, instead, at step 6090 it is determined that the handler 3060 request is one to disable one or more coupons, then in step 6100 all associated coupons are identified, and then in step 6110 each of these coupon is marked as disabled in the coupon database 3080, following which the handler 3060 terminates at step 6060. Alternatively, if the check in step 6120 determines that the management handler 3060 request is one to enable one or more coupons, then in step 6130 all associated coupons are identified, and then in step 6140 each of these coupon is marked as enabled in the coupon database 3080, following which the handler 3060 terminates at step 6060.

If it is determined that the coupon management handler 3060 request is not a request to retrieve one or more coupons at step 6150, then the handler 3060 terminates at step 6060. Otherwise, in step 6160, all associated coupons are identified, after which, in step 6170, a web page is created containing applets for each matching coupon, each of these applets allowing the receiver of the web page to exercise the corresponding coupon. This web page is returned to the requester in step 6180, and thereafter the handler terminates at step 6060. A skilled artisan will appreciate that the coupon applets seen by the responding user (e.g., user 2 2510) can provide a display of the enabled versus disabled state of a given coupon. This would allow them to only exercise a given coupon when the coupon—and hence the corresponding telephone channel—was available.

Figure 7:
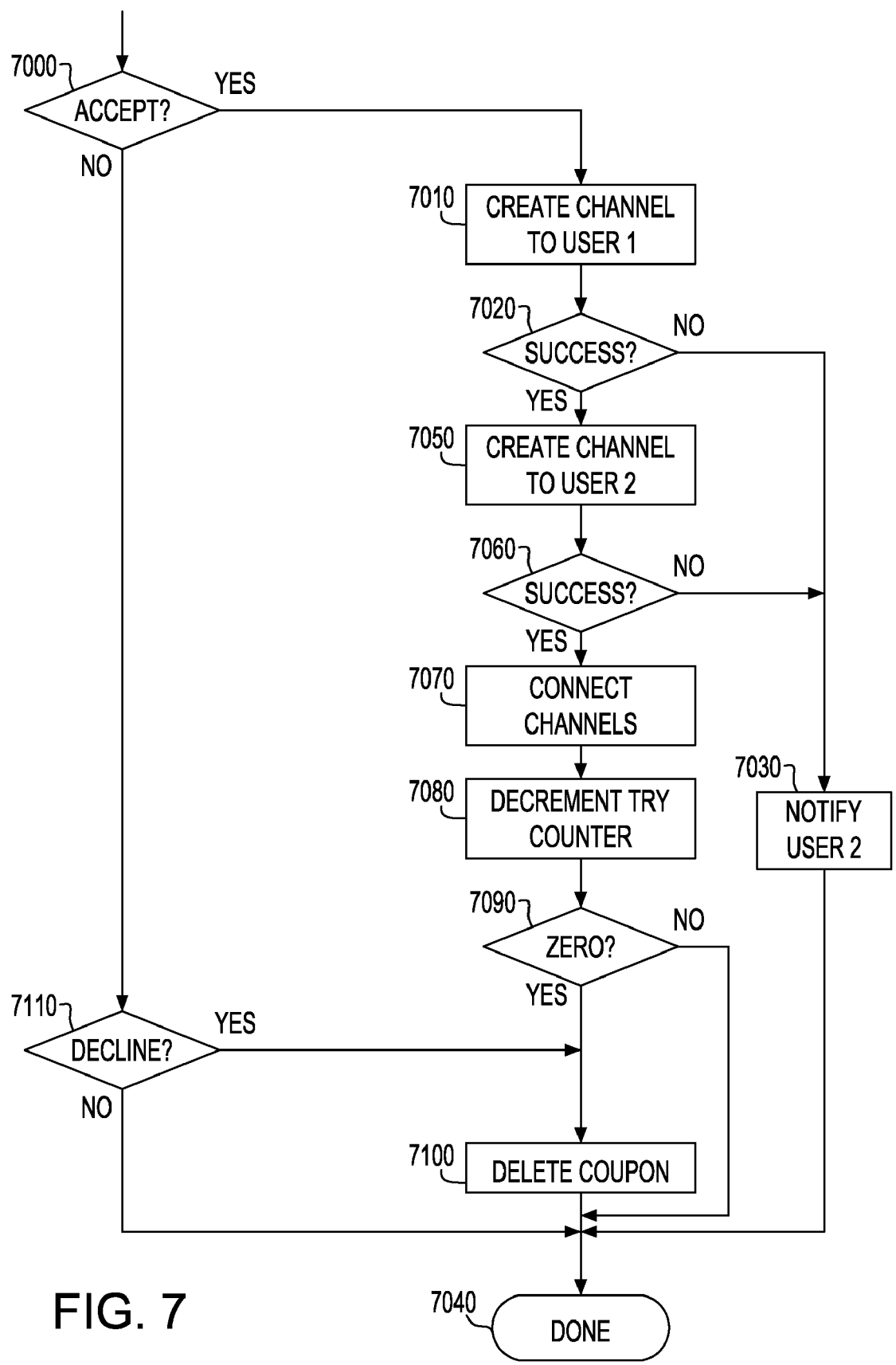
FIG. 7 is an example of the coupon response handler according to a first embodiment of the current invention.

FIG. 7 illustrates the logic flow implemented by the coupon response handler 3070, according to a first embodiment of the present invention. In step 7000, a received request is checked and if it is determined that the request is one from a user accepting a coupon-based communication request, then in step 7010, the handler 3070 first invokes the PBX handler 3090 to create a communications channel over the telephone network 2570 to the coupon sender's (e.g., user 1 2500) telephone network node 2530 (FIG. 2). At step 7020, a determination is made as to whether the attempt to create a channel to user 1 was successful and, if not successful, the responding user (e.g., user 2 2510) is sent a notification of the failure in step 7030, following which the handler 3070 terminates at step 7040. A skilled artisan will appreciate that the responding user may then try and exercise the coupon again later. If the creation attempt is successful, then in step 7050, the handler 3070 invokes the PBX handler 3090 to create a communications channel over the telephone network 2570 to the responder's telephone network node 2550 (FIG. 2). This attempt is checked at step 7060, and, if the attempt to create a channel to user 2 was not successful, the responding user (e.g., user 2 2510) is sent a notification of the failure in step 7030, following which the handler 3070 ends at step 7040. If the creation attempt was successful as determined at step 7060, then at step 7070 the handler 3070 connects, or conferences the two newly created channels together. The handler 3070, then decrements the coupon's retry counter—if provisioned with one—at step 7080, and then checks whether there are remaining retries in step 7090. If there are no more retries available, the handler 3070 ends in step 7040. Otherwise, if there are more retries available, the handler 3070 invokes the coupon management handler 3060 to delete the current coupon in step 7100, following which the handler 3070 ends at the 7040.

At step 7110 a further determination is made as to whether the response is one declining the coupon's communication request, and, if so, invokes the coupon management handler 3060 to delete the current coupon in step 7100, following which the handler 3070 ends at step 7040. If the response is also not the refusal of a coupon (as determined at step 7110), the handler 3070 ends at step 7040. Those with regular skill in the art will appreciate that the refusal response may include a note, possibly indicating why the coupon was refused. One with ordinary skill in the art will also appreciate that the coupon response handler 3070 could display this refusal note to the initiating user (e.g., user 1 2500). A skilled artisan will also appreciate that the coupon response handler 3070 may additionally handle other types of responses, including but not limited to: a message to the initiating user indicating when the responding user will accept the coupon, e.g., "I'll talk to you in 5 minutes."

FIG. 8 depicts a more detailed example of the data network nodes 2520 and 2540, through which user 1 2500 and user 2 2510 respectively conduct data network based communications, including but not limited those to the coupon server 2580. As shown in FIG. 8, each node 8000 preferably includes a CPU 8010, a storage device 8020, such as a disk or a direct access storage device (DASD); a data network interface 8030; a memory 8040 such as RAM; an HTTP client handler 8050 and, a client notification handler 8060. According to the present invention, the data network node's logic (as will be discussed in more detail with reference to FIG. 9), is preferably embodied as computer executable code that is loaded from remote (e.g., over the data network 2560 via the data network interface 8030) or local permanent optical (e.g., CD-ROM) or magnetic storage such as disk, or DASD 8020 into memory 8040 for execution by CPU 8010. Data network 2560 communications to and from the node 8000 are made through the network interface 8030, communication types including but not limited to Ethernet, token-ring, and wireless such as RF- and IR-based.

Figure 9:
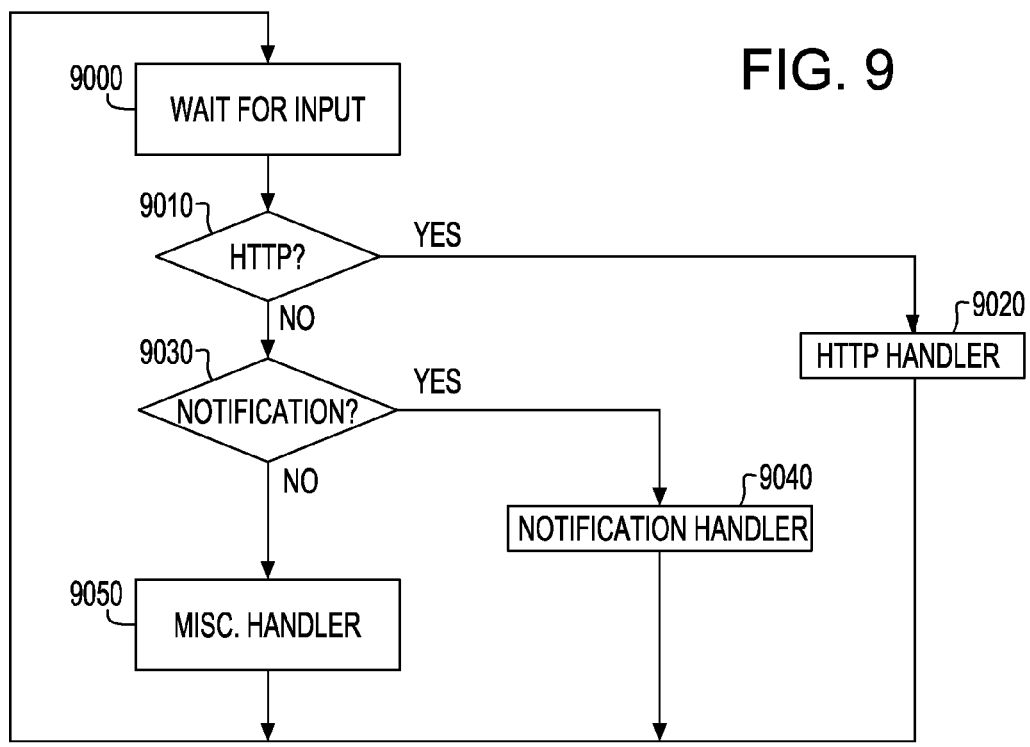
FIG. 9 is a flow chart of the data network node's logic according to a first embodiment of the current invention.

FIG. 9 illustrates the logic flow implemented at each of the data network nodes 2520 and 2530. As shown, in step 9000, the node is placed in a wait state to wait for input. Once input is received, the type of input it is checked at step 9010, and if it is HTTP related (e.g., a request user's request for a web page, or the response from an HTTP server), then the HTTP client handler 8050 is invoked in step 9020, following which control continues at step 9000. If the input is not HTTP related, then the input is checked at step 9030 to determine whether it is notification related (e.g., a notification sent from the coupon server's notification handler 3100). If so, then the notification handler 8060 is invoked in step 9040, following which control continues at step 9000. If the input is not a notification related, then a miscellaneous handler beyond the scope of the current invention, is invoked at step 9050, following which control continues at step 9000.

A second embodiment of the present invention is now described in detail with reference to FIGS. 8-16. In this second embodiment a given user monitors their own telephone communications, and handles the associated communications capability coupon creations, deletions and modifications, rather than the intermediary coupon server 2580 used in the first embodiment. Eliminating the coupon server 2580 additionally means that a given user can take advantage of the current invention without having to use a telephone controlled by a customized central handler (e.g., a PBX). For example, if a local phone company (e.g., Verizon) offered data network related services, they could provide services like those of the coupon server 2580, without these having to be a special customized local PBX.

Figure 11:
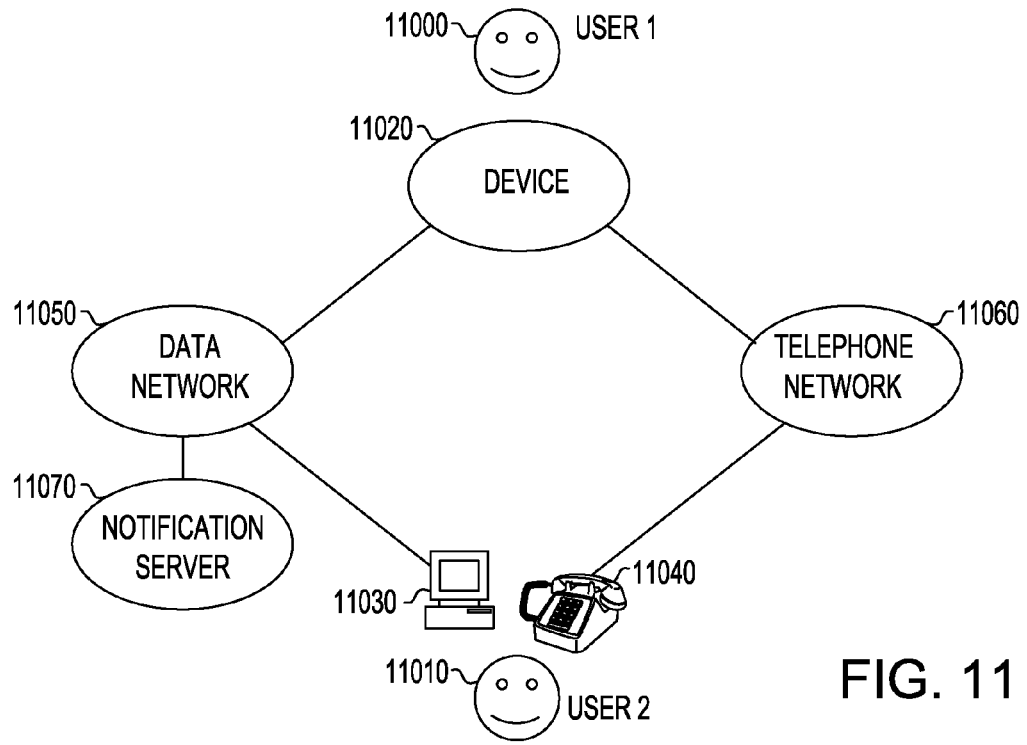
FIG. 11 is a diagram of a network according to a second embodiment of the current invention.

FIG. 11 depicts an example of the network topology of the second preferred embodiment. As shown, there is a first 11000 and second 11010 user, user 1 and user 2 respectively, user 1 11000 having a single device 11020 connected to both a data network 11050 and a telephone network 11060; and user 2 11010 having both a data network node 11030 connected to data network 1105 and a telephone network node 11040 connected to telephone network 11060. There is also a notification server 11070 connected to the data network 11050. Examples of the data network 11050 include, but are not limited to, the Internet and private intranets. Examples of the telephone network 11060 include, but are not limited to the standard telephone networks, access to which is provided by Verizon and AT&T, for example. The data network node 11030 (described in detail with reference to FIGS. 8 and 9 herein) can include, but is not limited to, an IBM ThinkPad rung Windows 95 and a web browser such as Microsoft's Internet Explore, or Apple's Power Macintosh running MacOS 8.5.6 and a web browser such as Netscape's Navigator. Data network nodes also include network-connectable mobile (e.g., portable) devices such as that sold under the trademark WorkPad by IBM, as well as smart cellular telephones (e.g., devices which can act as a cellular telephone as well as run network applications, like web browsers), like that sold under the trademark Nokia 9000i by Nokia. The telephone network node 11040 may include any device able to support communications through the telephone network 2570, including standard telephones like those sold by Verizon and mobile phones, like that sold under the trademark Nokia 9000i by Nokia.

Just as in the first embodiment, although each of users 1 11000 and 2 11010 is shown having only a single data network node and telephone network node, the current invention is able to support users employing more than one of each. Also, although only two users are shown, the current invention is able to support more than two. Examples of device 11020, described in detail herein with reference to FIGS. 12-16, include any device that can communicate through both data communications and telephone network, such devices including but not limited to that sold under the trademark Nokia 9000i by Nokia. A skilled artisan will appreciate that user 2's 11010 pair of device, 11030 and 11040 may be a similar single device. Furthermore, the notification server 11070 may comprise any computing node that can function as the communication server for the client notification handlers 8060 and 12090, respectively described in detailed with references to FIG. 8 and further with respect to FIG. 12, described hereinbelow. This includes, but is not limited to the products sold by the present assignee International Business Machines Inc. (IBM) under the trademark PowerPC, running the operating system and server application suite sold by Microsoft under the trademark Windows NT, this node also running the messaging server application including, but not limited to such products as that sold by Lotus under the trademark Sametime.

Figure 10:
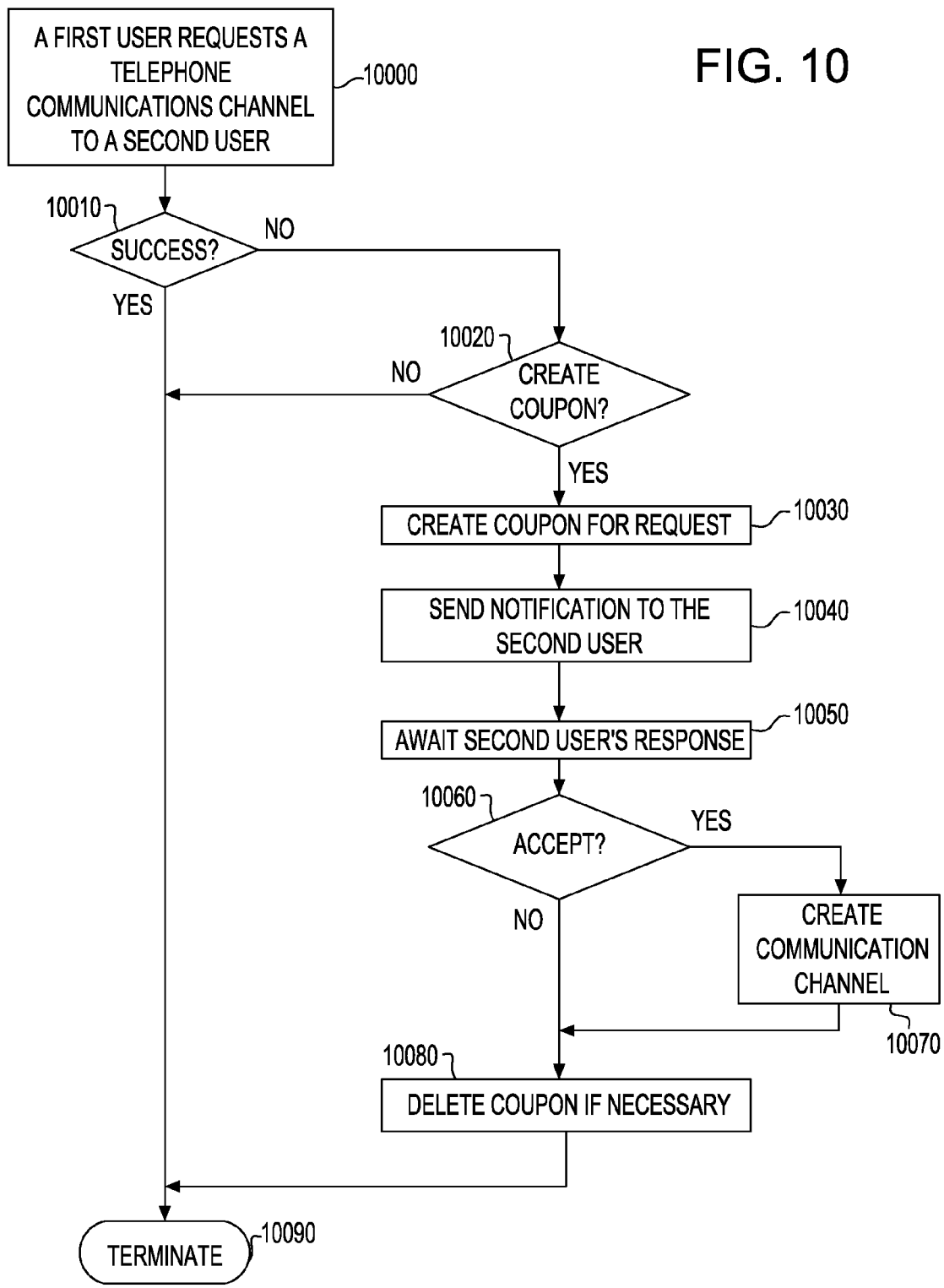
FIG. 10 shows an overview of the current invention's process according to a second embodiment of the current invention.

FIG. 10 illustrates an overview of the process according to the first embodiment of the invention. In step 10000, a first user, user 1 11000, requests a telephone call with a second user, user 2 11010. In step 10010 a determination is made as to whether this communication attempt was successful. If it was successful, then the process terminates at step 10090. Otherwise, if the communication attempt was not successful, then at step 10020, the initiating user 11000 is asked whether they want to create a communications capability coupon related to the request. If the user 11000 does not want to create a coupon, then the process terminates at step 10090. Otherwise, in step 10030, a coupon related to the failed request is created, after which a notification is sent to the second user 11010 in step 10040 informing the second user 11010 of the coupon's existence. In step 10050 the process awaits a response from the second user 11010, which, when received is checked in step 10060. If the response is an acceptance, then the telephone call is established in step 10070. Regardless of whether the second user 11010 accepts or not, the coupon is deleted, if necessary, at step 10080, following which the process terminates at step 10090. As described above, with reference to FIG. 7, it is possible for a given coupon to be used many times. Thus, in some circumstances, a given coupon would not be deleted in step 10080, such as when the coupon still allows the second user 11010 additional invocation (e.g., when its remaining count index is greater than 0).

Figure 12:
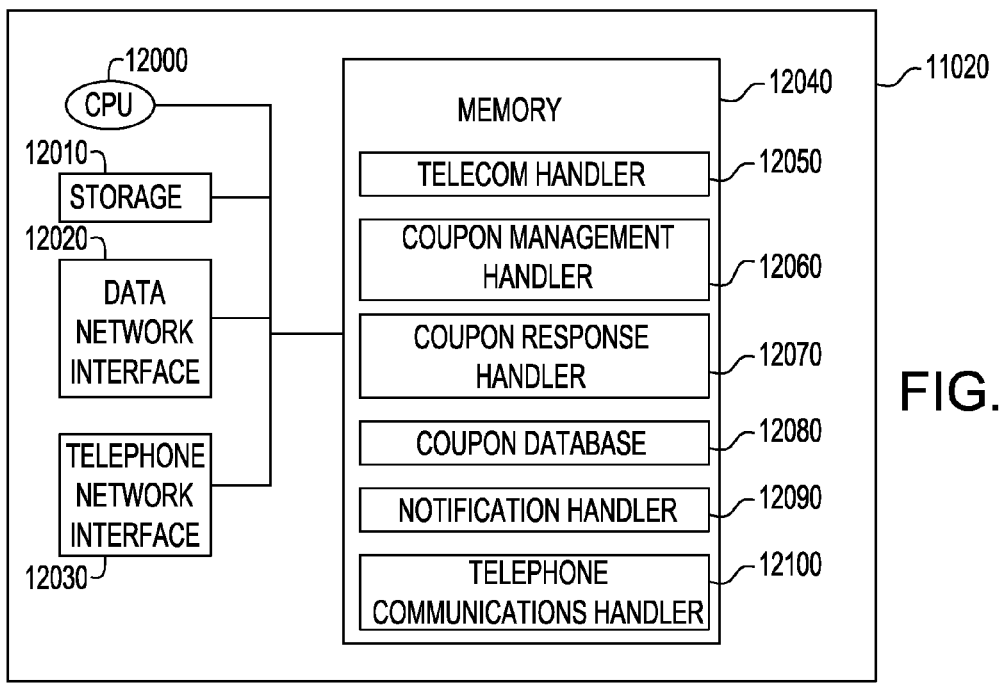
FIG. 12 is a component diagram of data network node according to a second embodiment of the current invention.

FIG. 12 illustrates a block diagram depicting the component diagram of user 1's 110000 data and telephone network device 11020, that allows user 1 11000 to make and receive both data—11050 and telephone-based network 11060 communications. The device 11020 preferably includes a CPU 12000, a storage device 12010, such as a disk or DASD; a data network interface 12020, a telephone network interface 12030, and memory 12040 such as RAM. According to the present invention, the device logic (as will be discussed in more detail with reference to FIG. 13), is preferably embodied as computer executable code that is loaded from remote (over the data network 11050 via the data network interface 12020) or local permanent optical (CD-ROM) or magnetic storage such as disk, or DASD 12010 into memory 12040 for execution by CPU 12000. Data network 11050 communications to and from the server are made through the data network interface 12020, communication types, including, but not limited to wired and wireless such as RF-based. Telephone network 11060 communications, including those between devices 11020 and 11040 are managed through the telephone network interface 12030. The memory 12040 preferably includes a telecom handler 12050 (described in greater detail with reference to FIGS. 13 and 14), a coupon management handler 12060 (described in more detail with reference to FIGS. 13 and 15), a coupon response handler 12070 (described in more detail with reference to FIGS. 13 and 16), a coupon database 12080, a notification handler 12090, and a telephone communications handler 12100. Applications that would support the coupon database 12080 are well known in the art, and include, for example, but are not limited to: custom database applications written in C or Java. Those with regular skill in the art will appreciate that the coupon database 12080 may be executed on another remote network connected node and then accessed via the data network 11050. An example of a product that would support the telephone communications handler 12100 includes the telephone communications support subsystem of the Nokia 9000 product sold by Nokia. Finally, an example of a product that would support the notification handler 12090 includes, but is not limited to the product sold by Lotus under the trademark Sametime.

Figure 13:
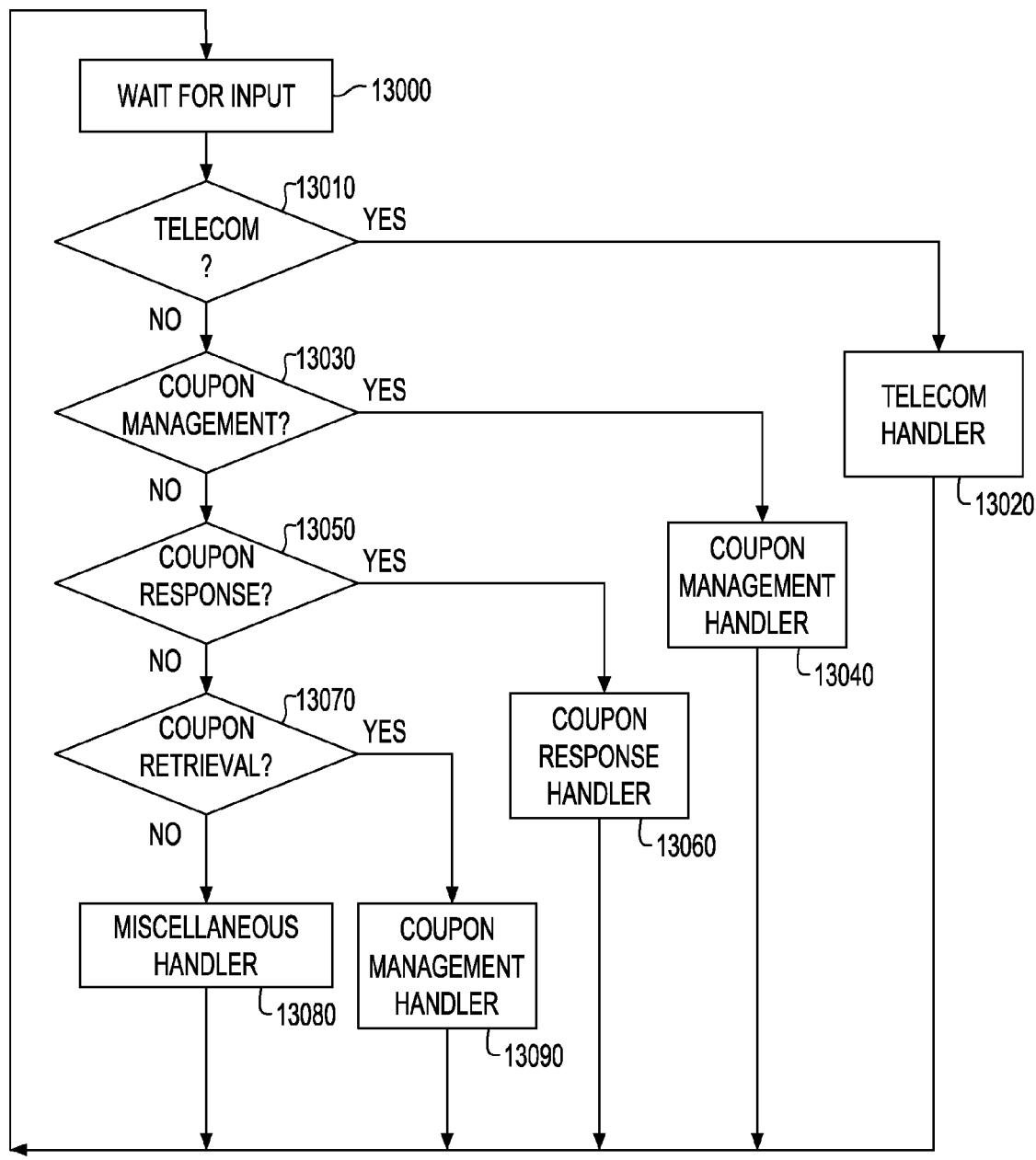
FIG. 13 is a flow chart of the data network node's logic according to a second embodiment of the current invention.

FIG. 13 illustrates the logic flow implemented by the data network node 11020. As shown, in step 13000 the device 11020 is in a wait state waiting for input. Once received, the type of input received is checked at step 13010. If it is telephone related (e.g., an attempt from the first user 11000 to call the second user 11010), then the telcom handler 12050 is invoked at step 13020, following which control continues at step 13000. If the input is not telephone related, then it is checked in step 13030 to see whether it involves coupon management (e.g., a request from the first user 11000 to create or delete a coupon). If the received input involves coupon management, then the coupon management handler 12060 is invoked at step 13040, following which control continues at step 13000. If the check in step 13030 fails, then it is determined at step 13050 whether the received input concerns a response to a coupon (e.g., the second user accepting the coupon's request), and if so, then the coupon response handler 12070 is invoked in step 13060, following which control continues at step 13000. If the check in step 13050 fails, then it is checked at step 13070 to determine whether it is a request for a coupon (e.g., a request by the second user 11010 for all coupons related to themselves, a request likely to occur when the second user 11010 starts up their data network node 11030). If it is a request for a coupon, then the coupon management handler 12060 is invoked in step 13090, following which control continues at step 13000. Otherwise, if the input is not a coupon retrieval request then a miscellaneous handler, beyond the scope of the current invention, is invoked at step 13080, following which control continues at step 13000.

Figure 14:
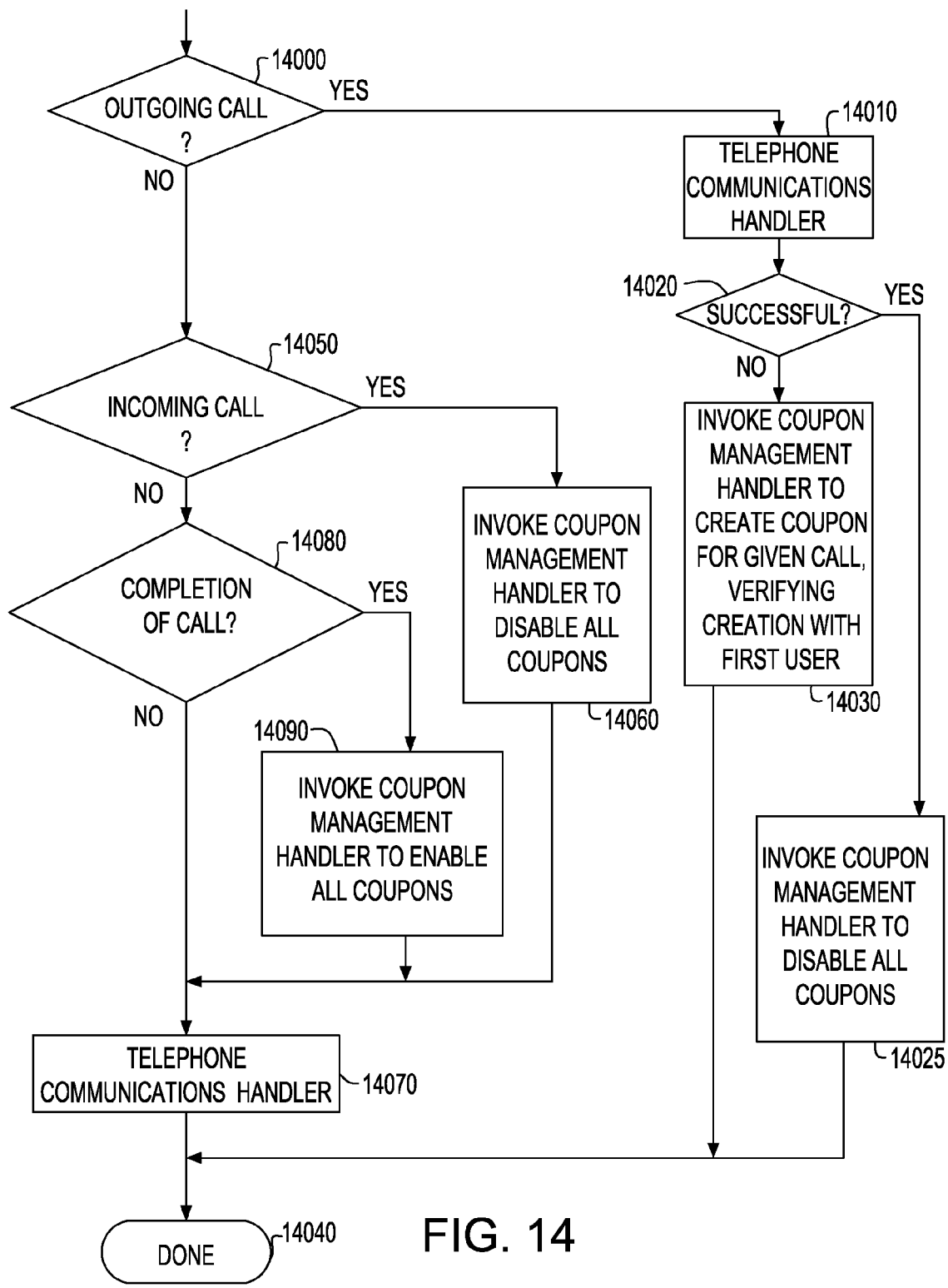
FIG. 14 is an example of the telcom handler according to a second embodiment of the current invention.

FIG. 14 depicts the logic flow of the telcom handler component 12050 of network node device 11020 according to the second embodiment of the current invention, which allows the device 11020 to monitor the telephone network communications to and from user 1 11000 for purposes of creating and updating user 1's communications capability coupons. As shown, at step 14000, the handler 12050 checks whether the given telephone event is a call from user 1 11000. If it is, then in step 14010, the telephone communications handler 12100 is called to try and establish the requested communications channel. The success of this attempt is checked in step 14020, and if the channel was created, then in step 14025, the coupon management handler 12060 is invoked, passed the number of the internal telephone network node and instructed to disable all coupons associated with this number. This is done to avoid unnecessary connection attempts to the now busy telephone. Following this, the telcom handler 12050 terminates at step 14040. If the connection attempt fails, then, in step 14030, the coupon management handler 12060 is invoked to ask user 1 11000 if they want to create a communications capability coupon. If so, the telephone number of both the initiator and target are passed in this invocation, and the corresponding coupon is created if they accept. Following this, the handler process 12050 ends at stop 14040. If the received event is not a call from user 1 11000, then, in step 14050, the handler 12050 checks whether the event is a call to user 1 11000. If the event is a call to user 1 11000, then in step 14060, the coupon management handler 12060 is invoked, passed the number of the internal telephone network node and instructed to disable all coupons associated with this number. This is done to avoid unnecessary connection attempts to the now busy telephone. Following step 14060, the telephone communications handler 12100 is invoked at step 14070 to complete the call, after which the telcom handler 12050 ends at step 14040. If the check made at step 14050 fails, then at stop 14080 it is determined whether the telephone event is the completion of a call to user 1 11000. If so, then in step 14090, the coupon management handler 12060 is invoked, passed the telephone number and instructed to enable all associated coupons. Following step 14090, the telephone communications handler 12100 is called at step 14070 to fulfill the call completion (if necessary), after which the handler 14050 ends in step 14040. If the check in step 14080 fails, then the telephone communications handler 12100 is invoked at step 14070, following which the handler process terminates at step 14040.

Figure 15:
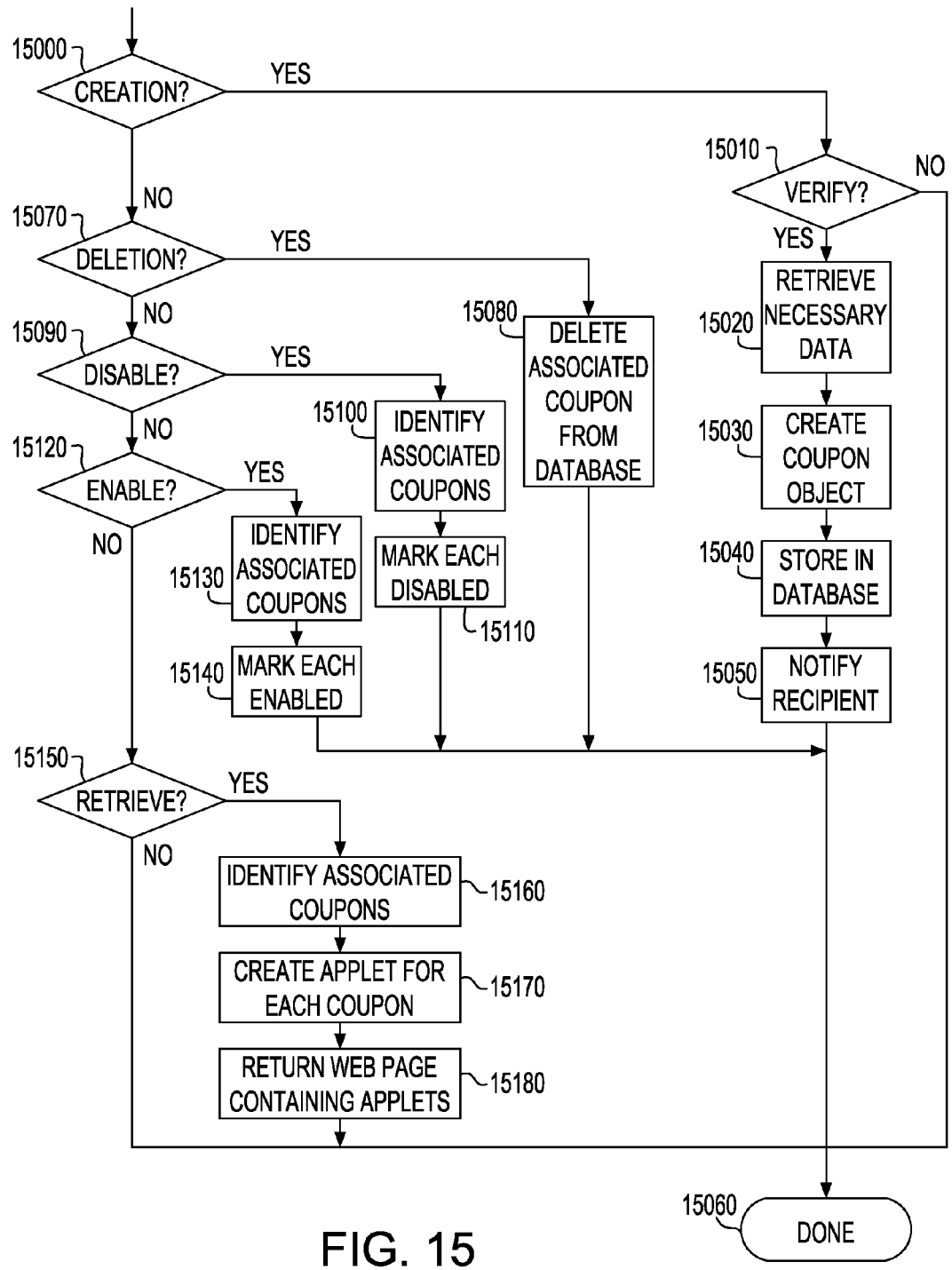
FIG. 15 is an example of the coupon management handler according to a second embodiment of the current invention.

FIG. 15 is a flow diagram depicting the logic implemented by the coupon management handler 12060, according to the second embodiment of the current invention, which handles the creation, deletion, state modification and retrieval of communications capability coupons. As shown, a check is first made at step 15000 to determine whether the current handler request is for the creation of a coupon. If the current handler request is for the creation of a coupon, then at step 15010, if specified in the handler 12060 request, user 1 11000, is prompted to verify that they really want to create a coupon. If not, then the handler 12060 terminates at step 15060. If user 1 does want to create a coupon, then at step 15020, the handler 12060 retrieves all data required for the creation of a coupon. Such data includes but is not limited to: the telephone number of a call initiator and target, as well as a user ID for the target user, e.g., user 2 11010. As in the first embodiment, this user JD is the target user's Sametime ID, but the current invention also supports other forms, including, but not limited to a user ID/password pair. Next, at step 15030, a coupon object is created for the given information, this object including, but not limited to an instance of a Java class. In step 15040, the coupon object is stored in the coupon database 12080, and in step 15050, the target user, e.g., user 2 11010, is sent a notification of the existence of the coupon. This notification is sent using a Sametime message using the notification handler 12050, this message including a URL that, when retrieved, will provide an applet the retriever can use to exercise the coupon. Following step 15050, the handler 12060 terminates at step 15060. Otherwise, returning to step 15000, if the current handler request is not for the creation of a coupon then a check is performed at step 15070 to determine whether the handler 12060 request is for a coupon deletion. If the handler 12060 request is for a coupon deletion, then, at step 15080, the associated coupon is identified and then deleted from the coupon database 12080, following which the handler 12060 terminates at step 15060. If, instead, the current handler request is not for the deletion of a coupon, it is determined at step 15090 whether the handler 12060 request is one to disable one or more coupons. If the request is for coupon disablement, then in step 15100 all associated coupons are identified, and then in step 15110 each of these coupon is marked as disabled in the coupon database 12080, following which the handler 12060 terminates at step 15060. Alternatively, if the current handler request is not for the disablement of a coupon, then the process proceeds to step 15120 to determine whether the management handler 12060 request is one to enable one or more coupons. If the management handler 12060 request is one to enable one or more coupons, then the process proceeds to step 15130 where all associated coupons are identified, and in step 15140, marked as enabled in the coupon database 12080, following which the handler 12060 terminates at step 15060. If the check performed at step 15120 does not determine that the management handler 12060 request is one to enable one or more coupons, then step 15150 is invoked to determine whether the request is one to retrieve one or more coupons. If the check at step 15150 determines that the request is not one to retrieve coupons, then the handler 12060 terminates at step 15060. Otherwise, the process proceeds to step 15160 to identity all associated coupons, and, after which, at step 15170, to create a web page including applets for each matching coupon, each of these applets allowing the receiver of the web page to exercise the corresponding coupon. This web page is returned to the requester at step 15180, following which the handler terminates at step 15060.

Figure 16:
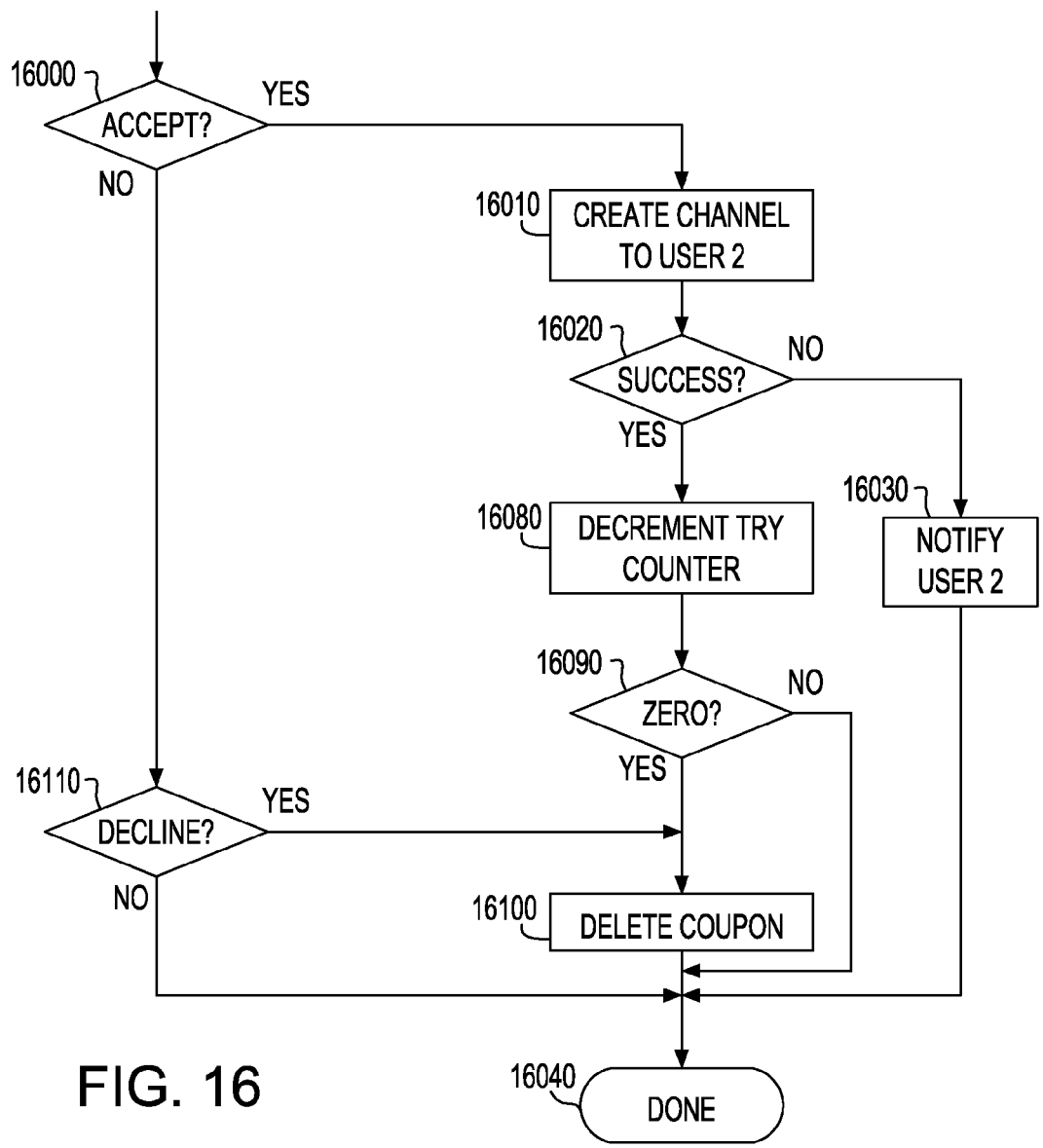
FIG. 16 is an example of the coupon response handler according to a second embodiment of the current invention; and, FIG. 17 is an example of a communications capability coupon-based business process.

FIG. 16 is a flow diagram depicting the logic implemented by the coupon response handler 12070, according to a second embodiment of the current invention. The following is a description of how the coupon response handler 12070 manages a response from user 2 11010, but it is understood that this handler may also manage coupon responses from any user. In step 16000, the request is checked to see if it is a coupon-acceptance. If it is, then in step 16010, the handler 12070 asks the telephone communications handler 12100 to create a communications channel over the telephone network 11060 between the device 11020 and user 2's 11010 telephone network node 11040. This attempt is checked in step 16020, and, if not successful, the responding user, user 2 11010, is sent a notification of the failure at step 16030, following which the coupon response handler 12070 ends at step 16040. A skilled artisan will appreciate that the user 2 11010 may then try and exercise the coupon again later. If the creation is successful, then the handler 12070 proceeds to step 16080 where the it decrements the coupon's retry counter, if it has one, and then checks whether there are remaining retries in step 16090. If there are no retries left, the handler 12070 ends at step 16040. Otherwise, the handler 12070 invokes the coupon management handler 12060 to delete the current coupon in step 16100, following which the handler 12070 ends at the 16040.

Returning to step 16000, if the received response is not the acceptance of a coupon, then step 16100 the handler 12070 checks to see if the response is one declining the coupon's communication request, and, if so, invokes the coupon management handler 12060 to delete the current coupon in step 16100, following which the handler 12070 ends at step 16040. If the response is not the refusal of a coupon, the handler 12070 ends at step 16040.

Figure 17:
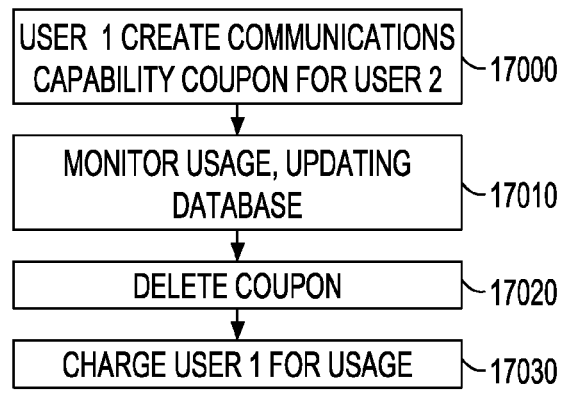

FIG. 17 depicts an example of a communications capability coupon-based business process based on the first embodiment of the current invention, described in detail with reference to FIGS. 1 through 10. A skilled artisan will appreciate how is it also applicable to the second embodiment, as well as any other use of communications capability coupons. As shown, in step 17000, user 1 2500 creates a communications capability coupon for user 2 2510, that is, a coupon through which user 2 may establish a communications channel over telephone network 2570 to user 1 2500. As mentioned, a given communications capability coupon may provide user 2 with the ability to have this communications channel established even though user 1's 2500 telephone network node 2530 is already in use, this being an option that is specified when the given coupon is created and is stored in the coupon database 3080. In step 17010, the usage of the coupon is monitored, and all relevant data is stored in the given coupon's entry in the coupon database 3080. This monitoring and database update is executed by the telcom handler 3050, the coupon management handler 3060, and the coupon response handler 3070 components described in detail with reference to FIGS. 5, 6, and 7, respectively. Next at step 17020, the coupon is eventually deleted, as is described with reference to FIG. 6. At this point the coupon management handler 3060 may tabulate the total charges incurred by the coupon. These charges may include, but are not limited to: any and all telephone network charges incurred due to creation of channels between user 1 2500 and user 2 2510, as well as uses of the break in option. A skilled artisan will appreciate that user 1 2510 could even be charged for the coupon, even if no communications were ever established with it, the fee due to its being made available to user 2 2510. This is an option made possible through the use of many network and computing resources, e.g., the coupon server 2580. Finally, in step 17030, these charges are sent to and collected from user 1 2500.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A method for establishing communications between first and second parties through the intermediary of a server device, said method comprising the steps of:
generating a request initiated by a first party for establishing a communications channel over a first communications network between said first party and a second party, said first communications network comprising a telephone communications network;
interrupting, at a server device associated with said first communications network, receipt of said request and translating the request into a data network object representing a communications capability for subsequently establishing, at a plurality of times, a communications channel between said first party and second party, said data network object maintaining state information concerning use of said communications capability, said maintained state information including an identification (ID) of the first party and information for subsequently establishing, via said data network object, a communications channel between said first and second party over said first communications network, and, an indication of a number of times the second party is allowed to invoke the data network object; and,
sending the data network object to the second party via a second communications network, said second communications network comprising a data communications network, said network object enabling a second party to communicate acceptance of communicating with said first party upon receipt thereof or at a future time back to said server device;
upon receipt of said acceptance, initiating via said server device, creation of a communications channel between the first and second parties over said first communications network, and,
implementing, at said server device, a counter for tracking each subsequent communication successfully completed between the first and second parties over said first communications network, said server device decrementing said counter each time the data network object is successfully used to establish a subsequent call that has been completed between the first and second parties over said channel in said first communications network.

2. The method for establishing communications as claimed in claim 1, whereby the establishment of said communications channel is synchronous.

3. The method for establishing communications as claimed in claim 1, wherein said server device is connected to both said first and second networks, said second party accepting a network object's request and communicating this acceptance to the server device via the second network.

4. The method for establishing communications as claimed in claim 1, wherein said network object including said request appears on a second party's attached network device.

5. The method for establishing communications as claimed in claim 1, wherein said first communications and second communications networks are data networks, said first party initiating establishment of a communications connection with the second party using a computer application, said network object including said request appearing on a second party's attached network device.

6. The method for establishing communications as claimed in claim 1, wherein said network object enables a second party to reject the request, said method further including generating a rejection message for display on a first party's attached network device.

7. The method for establishing communications as claimed in claim 6, further including the step of translating the rejection message from text into voice message and playing the translated voice message to the first party over an attached communications device via said first communications network.

8. The method for establishing communications as claimed in claim 1, further comprising the step of: enabling the second party to generate a return message for receipt by said first party via said network object.

9. The method for establishing communications as claimed in claim 1, further including the step of: providing a listening application for determining availability of the second party via said second communications network, wherein said sending further comprises establishing a socket connection to said listening application for delivering said request to the second party.

10. The method for establishing communications as claimed in claim 1, wherein said sending further comprises establishing delivery of said request to the second party by embedding said request in an Instant Message.

11. The method for establishing communications as claimed in claim 1, wherein said sending further comprises establishing delivery of said request to the second party by embedding said request in an e-mail message.

12. The method for establishing communications as claimed in claim 1, wherein said interrupting is invoked automatically upon failure to establish a communication channel to said second party.

13. The method for establishing communications as claimed in claim 1, wherein said maintained state information further includes an amount of monetary charges said first party is willing to pay for establishing said communication channel between the first and second parties over said first communications network, said server device tabulating a total charges incurred by said data network object usage.

14. The method for establishing communications as claimed in claim 1, further comprising: temporarily deactivating, via said server device at the initiation of said first party, the data network object for periods when the first party is unavailable.

15. The method for establishing communications as claimed in claim 1, further comprising: deleting, via said server device, the data network object in response to a request from the first party.

16. The method for establishing communications as claimed in claim 1, further comprising: permitting, via said server device, the second party to break into an existing telephone communications channel as an invocation of said data network object.

17. A system for establishing communications between first and second parties comprising:
a means for generating a request initiated by a first party for establishing a communications channel over a first communications network between said first party and said second party;
an intermediary server means for interrupting receipt of said request and for translating the request into a network object representing a communications capability for subsequently establishing, at a plurality of times, a communications channel between said first party and second party, said data network object maintaining state information concerning use of said communications capability, said maintained state information including an identification (ID) of the first party and information for subsequently establishing, via said data network object, a communications channel between said first and second party over said first communications network, and, an indication of a number of times the second party is allowed to invoke the data network object; said intermediary server means communicating the network object to the second party via a second communications network, said network object enabling a second party to communicate acceptance of communicating with said first party upon receipt thereof or at a future time back to said server device, said intermediary server means further initiating creation of a communications channel between the first and second user; and
said intermediary server means further implementing a counter for tracking each subsequent communication successfully completed between the first and second parties over said second communications network, said intermediary server means decrementing said counter each time the data network object is successfully used to establish a subsequent call that has been completed between the first and second parties over said channel in said second communications network.

18. The system for establishing communications as claimed in claim 17, wherein said intermediary server is connected to both first and second communications networks, said second party accepting a network object's request and communicating this acceptance to the intermediary server via the second communications network.

19. The system for establishing communications as claimed in claim 18, wherein said first communications network is a telephone communications network and said second communications network is a data communications network, said network object including said request appearing on a second party's attached network device.

20. The system for establishing communications as claimed in claim 18, wherein said first and second communications networks are data communications networks, said first party initiating establishment of a communications connection with the second party using a computer application, said network object including said request appearing on a second party's attached network device.

21. The system for establishing communications as claimed in claim 17, wherein said network object includes means for enabling a second party to generate a message concerning said request back to said first party via said network object, said system further including means for generating a corresponding message for display on a first party's attached network device.

22. The system for establishing communications as claimed in claim 17, wherein a rejection message includes a text message for rejecting said request, said system further including means for translating the rejection message from text into a voice message and for playing the translated voice message to the first party over an attached synchronous communications device via said first communications network.

23. The system for establishing communications as claimed in claim 17, wherein said intermediary server includes means for determining availability of a second party via said second communications network.

24. The system for establishing communications as claimed in claim 23, wherein said intermediary server includes means for establishing a socket connection from said availability determining means for delivering said request to the second party.

25. The system for establishing communications as claimed in claim 17, wherein said means for communicating the network object includes embedding said request in one or more of: an Instant Message, or e-mail message.

26. The system for establishing communications as claimed in claim 17, wherein said maintained state information further includes an amount of monetary charges said first party is willing to pay for establishing said communication channel between the first and second parties over said first communications network, said intermediary server means tabulating a total charges incurred by said data network object usage.

27. A method for establishing a communications channel between a first and second user comprising the steps of:
generating a data network object at the initiation of a first user via a server device, said data network object representing a communications capability for subsequently establishing, at a plurality of times, a communications channel between said first party and second party, said data network object maintaining state information concerning use of said communications capability, said maintained state information including an identification (ID) of the first party and information for subsequently establishing, via said data network object, a communications channel between said first and second party over a second communications network, and, an indication of a number of times the second party is allowed to invoke the data network object;
providing said data network object to a second user, via a first communications network, said second user having the ability to either accept or reject said data network object upon receipt thereof or at a future time via said first communications network;
accepting said data network object by said second user, and upon acceptance of said data network object by said second user, said server device establishing a communications channel between said first user and said second user via said second communications network; and,
implementing, at said server device, a counter for tracking each subsequent communication successfully completed between the first and second parties over said second communications network, said counter being decremented each time the data network object is successfully used to establish a subsequent call that has been completed between the first and second parties over said communications channel in said second communications network.

28. The method for establishing a communications channel as claimed in claim 27, wherein said providing comprises establishing a socket connection between an attached second user's device and a listening application executing at said server device.

29. The method for establishing a communications channel as claimed in claim 27, wherein said providing comprises embedding said data network object in an Instant Message communicated to the second user.

30. The method for establishing a communications channel as claimed in claim 27, wherein said providing comprises embedding said data network object in an e-mail message communicated to the second user.

31. The method for establishing a communications channel as claimed in claim 27, wherein said establishing a communications channel between said first user and a second user includes the step of determining the identities of the first and second user and the communications channels supported by both the first and second user.

32. The method for establishing a communications channel as claimed in claim 27, wherein said establishing a communications channel between said first user and a second user includes determining the communications channels currently available to both the first and second user.

33. The method for establishing a communications channel as claimed in claim 27, wherein said establishing a communications channel between said first user and a second user includes determining said communications channel based on prioritized lists of communications channels for both the first and second user.

34. The method for establishing a communication channel as claimed in claim 27, wherein said maintained state information further includes an amount of monetary charges said first party is willing to pay for establishing said communication channel between the first and second parties over said second communications network, said server device tabulating a total charges incurred by said data network object usage.

* * * * *